Patented Apr. 10, 1951

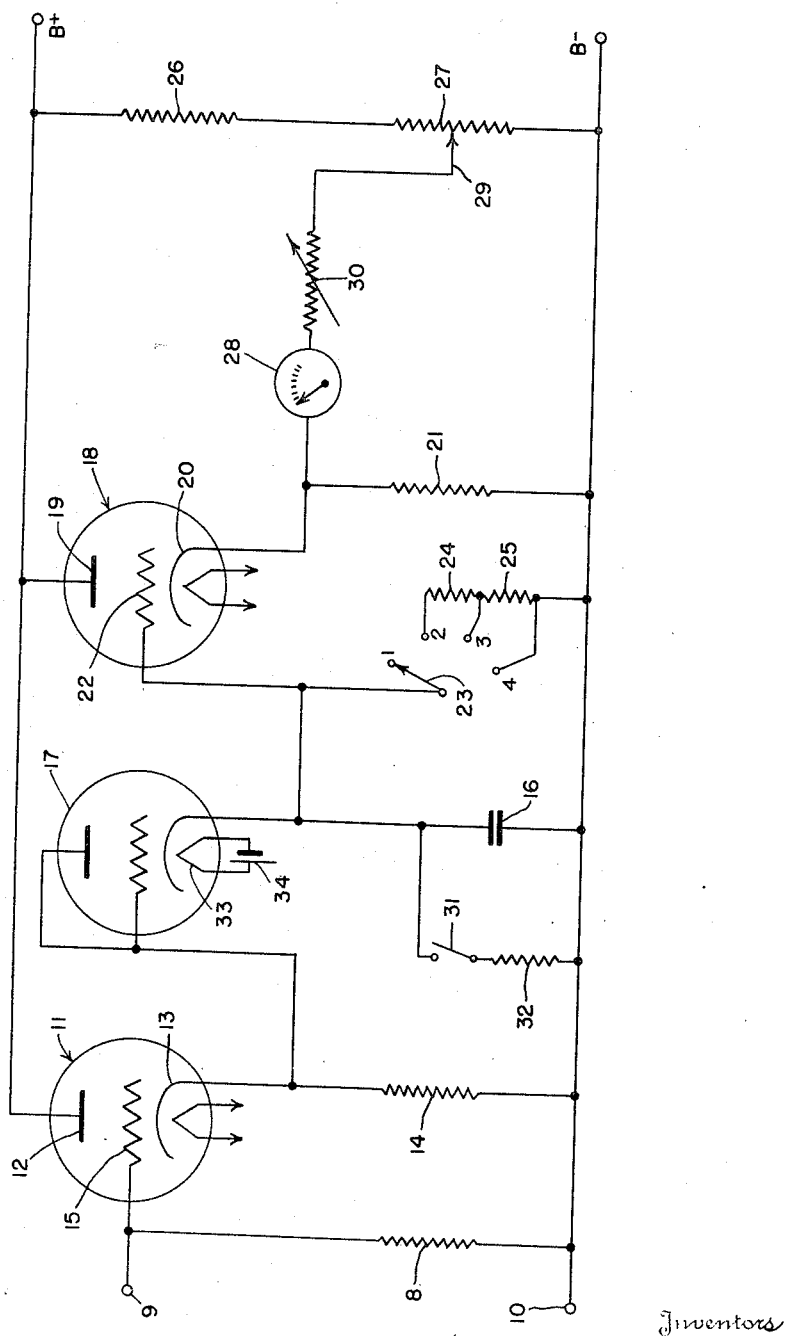

2,547,978

UNITED STATES PATENT OFFICE 2,547,978

TRANSIENT PEAK VOLTMETER

Clifford M. Ryerson, Milton H. Aronson, and Louis W. Erath, Washington, D. C.

Application May 16, 1945, Serial No. 594,134

5 Claims. (Cl. 171—95)

(Granted under the act of March 3, 1883, as amended April 30, 1928; 370 O. G. 757)

This invention relates generally to voltmeters and more particularly to an electronic voltmeter adapted to measure the peak value of electrical transients or surges.

Such a voltmeter is well adapted in use for measuring the transient voltages or electrical surges produced by transient signal simulators for mines and depth charges and to measure the output signals of the mine or depth charge mechanism to which the simulated signals are applied.

A voltmeter of this character is also well adapted to measure the transient surges produced by exploder mechanisms for torpedoes, such transients being relatively fast as compared with the transient signals encountered in the use of mines and depth charges.

Means heretofore employed for measuring the peak value of such transient signals have generally taken the form of an oscilloscope, together with the associated photographic means for obtaining a record of the oscilloscope image. Such means for measuring the peak value of the transients have not been found to be altogether satisfactory in service for the reason that such means are expensive and time-consuming in the use thereof, the principal time delay involved being interposed by reason of the usual time required between the exposure of the image and the drying of the developed film and the finished record.

In accordance with the voltmeter of the present invention energy storage means are employed for storing an amount of energy indicative of the peak value of a transient voltage applied to the voltmeter, and circuit means, including a one-way valved device is employed to prevent loss of the energy thus stored whereby a meter adapted to give an indication of the maximum value of the energy stored thus provides a true measure of the peak value of the applied transient voltage, means settable at will being employed to calibrate the indicating meter for such purpose.

It is an object of the present invention, therefore, to provide new and improved means for measuring the peak value of transient signals or electrical surges, or the like.

It is another object of the invention to provide a new and improved electronic voltmeter for measuring the peak value of transient signals in which simple circuit means are employed for expeditiously providing a true measure of the transient values.

Another object is to provide an electronic voltmeter in which energy storage means are employed to produce a voltage indicative of the peak value of the transient signal applied to the voltmeter.

A further object is to produce a voltage indicative of the peak value of a transient signal to be measured and to prevent, for a suitable interval of time, a reduction in value of the voltage produced whereby such voltage may be utilized to give a true measure of the peak value of the transient.

An additional object is to provide an electronic transient peak voltmeter adapted to produce and to retain a voltage indicative of the peak value of a transient voltage, or the maximum peak value of a signal having several peaks, or adapted selectively to produce a voltage indicative of variations in the envelopes of continuous signals.

Still other objects, advantages and features of the invention are those implied or inherent in the novel combination and arrangement of the electronic circuits employed as will become more fully apparent from the following description, reference being had to the accompanying drawings in which the single figure thereof diagrammatically illustrates a circuit arrangement for the electronic transient peak voltmeter of the present invention according to a preferred embodiment thereof.

Referring now to the drawing for a more complete understanding of the invention, the numerals 9 and 10 generally indicate the input to the voltmeter, which input may be suitable terminals feeding into the input of a cathode follower circuit including an electronic tube of any type suitable for the purposes such, for example, as the triode generally designated 11. The plate 12 of triode 11 is supplied from a suitable D. C. source designated B+—B-, and the cathode 13 of the triode is connected by way of the usual cathode load resistor 14 to input terminal 10 and the B- terminal of the D. C. supply source. It will be understood that the B+—B- supply may be provided in any convenient manner such, for example, by use of suitable batteries or by means of suitable rectifiers operating out of an A. C. source.

The control grid 15 of triode 11 is connected to input terminal 9, a resistor 8 of high value being connected across the input terminals thereby preferably to provide a high input impedance to the cathode follower. It will be understood that when greater sensitivity is desired, or when transient voltages of relatively small amplitude are to be measured by the voltmeter, a suitable amplifier may be interposed between input terminals 9 and 10 and the aforedescribed cathode follower circuit.

The cathode follower circuit advantageously provides a low output impedance across the load resistor 14 thereof whereby a condenser 16 of relatively large capacitance conveniently may be charged from the B+—B- supply by way of tube 11 and a one-way valve or rectifier, here shown to be a triode 17 which is connected as a diode and interconnected between the cathode 13 of tube 11 and condenser 16, tube 11 for the foregoing purpose preferably being capable of conducting a comparatively large plate current without drawing grid current. Also, the voltage swing of the cathode follower including tube 11 preferably is large compared to the voltage drop across triode 17 in order that the error introduced thereby is inappreciable.

The voltage appearing across condenser 16 is applied to the input of a second cathode follower circuit including any suitable electronic tube such, for example, as the triode generally designated 18, the plate 19 of which is connected to the B+ terminal of the D. C. supply, cathode 20 of which is connected to load resistor 21 and the control grid 22 of which is connected to condenser 16 and to the wiper 23 of a multi-position switch. Suitable resistors 24 and 25 are connected between positions 2, 3 and 4 of the switch for a purpose hereinafter to appear.

A voltage divider network comprising a resistor 26 and a potentiometer 27 is connected across the B+—B- supply, and a suitable indicating meter 28 is interconnected between the cathode 20 of tube 18 and a wiper 29 of potentiometer 27, a variable resistor 30 being interposed between the meter and the potentiometer.

The aforedescribed electronic voltmeter comprising the cathode follower, including tube 18, and its associated meter circuit may be of any conventional type, the potentiometer 27 in the arrangement shown being employed to set the zero reading of meter 28 and resistor 30 being employed to calibrate a given reading of the meter in accordance with the usual method. Tube 18, however, preferably is of a type having a high input impedance in order that the charge accumulated on condenser 16 will not be lost by way of leakage through the tube when wiper 23 is in position 1 of the multi-position switch, in which position grid 22 of tube 18 is caused to "float."

Any suitable manually-operable switch means 31 may be employed to discharge condenser 16 after each reading has been obtained from the indicating meter 28, the switch being connected across the condenser, preferably in series with a suitable resistor 32 for preventing arcing of the switch. It will be understood that, if desired, a recording meter may be employed in place of or in addition to the indicating meter 28 when it is desired to obtain a permanent record of the peak values of a number of single transients or variations in continuous signal envelopes of energy as measured by the voltmeter in the use of position three of the multi-position switch, as will appear presently in the description of the operation of the voltmeter.

When it is desired to measure the peak value of a single transient voltage, or the maximum peak value of a signal voltage having several peaks, wiper 23 of the multi-position switch is placed in position one thereof and switch 31 is momentarily closed, if necessary, to restore meter 28 to its zero position. The transient voltage to be measured is then applied across terminals 9 and 10. Cathode 13 of tube 11 follows the variation in the transient voltage and condenser 16 charges to the cathode potential by way of triode 17, the triode being connected so as to pass current in a direction to charge the condenser and to prevent passage of current in the opposite direction thereby preventing discharge of the condenser by way of load resistor 14 as the transient voltage decreases from the peak value thereof.

Discharge of condenser 16 by reason of leakage through tubes 17 and 18 substantially may be prevented in the selection of these tubes which, for this purpose, preferably are of a type well known in the art as acorn type tubes in which the elements or electrodes of the tubes are brought out of the envelopes thereof through widely-spaced seals and in which the usual pin or contact bases for the elements of the tubes are not employed, thereby substantially avoiding external tube leakages encountered in the use of conventional base-type tubes. Discharge of condenser 16 by reason of leakage by way of the heater element 33 of tube 17 substantially may be prevented by the use of any suitable insulated source of energy therefor, here shown to be a separate battery 34, the heaters of the other tubes being supplied from any other convenient source in any conventional manner.

The resistance of the leakage path for condenser 16 thus may be increased to a value upwards of two million megohms and the condenser caused to retain its charge without an appreciable loss therefrom over a period of several days. Moreover, such losses or leakage currents as tend to appear may be compensated for by selecting an optimum value for resistor 21 which sets the operating point of tube 18 such that the grid current flowing therein compensates for the leakage currents from condenser 16.

Thus condenser 16 is caused to charge to a value corresponding to the peak value of the transient voltage or the maximum peak value of a signal voltage having several peaks, as the case may be, and to retain or hold such value substantially indefinitely. This voltage is applied to the electronic voltmeter, including meter 28, which causes the meter to give an indication which provides a measure of the peak value of the transient voltage.

When it is desired to measure variations in signal envelopes applied to the voltmeter, wiper 23 of the multi-position switch is set in position three thereof. In such case, the charge on condenser 16 is permitted to discharge at a predetermined rate controlled by the value of resistor 25 and in such a manner as to follow, if desired, the variations in the signal envelope, the variations in the potential on condenser 16 being visibly observed by the deflections of the pointer of meter 28.

It will be understood that by proper selection of the circuit parameters the voltmeter may be arranged to give indications of transient voltages or surges of any duration. In measuring transients of very short duration, for example, it will be appreciated that the capacity of condenser 16 must be small in order that it be charged approximately to full value in response to the transient signals.

From the foregoing it should now be apparent that a voltmeter has been provided which is well adapted to fulfill the aforestated objects of the invention. Moreover, while certain circuit arrangements which provide a practical application of the principles of the invention have been described in particularity, it will be apparent to those skilled in the art to which the invention appertains that the invention is susceptible of additional circuit arrangements and modifications thereof without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a transient peak voltmeter of the character disclosed, the combination of a cathode follower having an input and an output, a condenser and a rectifier connected in series across the output for charging the condenser to a value corresponding to the maximum value of a signal applied to said input, an electronic meter, a high impedance input circuit including a floating grid for said meter, an R. C. circuit having a time constant corresponding to the period of a continuous signal envelope to be measured, and circuit means settable at will for applying the potential on the condenser to said electronic meter through said high impedance input circuit thereby to give a measure of the peak value of a transient signal applied to the input of said cathode follower or selectively settable at will to connect said R. C. circuit across said high impedance input circuit thereby to give a measure of the variations in a continuous signal envelope when applied to the input.

2. In a transient peak voltmeter of the character disclosed, the combination of a cathode follower having an input and an output, a condenser and a rectifier connected in series across said output for causing the condenser to be charged to a potential corresponding to the peak value of a transient signal applied to said input, an electronic meter for measuring the potential on the condenser, said meter comprising a cathode follower circuit having a high impedance input and including a tube having a floating grid connected to the condenser, and means for setting the operating point of the tube such that the grid current thereof is approximately equal to the leakage current of the condenser whereby the grid current supplies the condenser energy losses due to said leakage current.

3. In a transient peak voltmeter of the character disclosed, the combination of a cathode follower having an output, a condenser and an acorn type diode rectifier connected in series across said output, said diode having a heater element, a separate source of energy for said heater element, an electronic meter for measuring the voltage across said condenser, said meter comprising a cathode follower circuit having a high impedance input and including an electron discharge device having a floating control grid connected to the condenser, and means for setting the operating point of the electron discharge device such that the grid current thereof is approximately equal to the leakage current of the condenser whereby the grid current supplies the condenser energy losses due to said leakage current.

4. In a transient peak voltmeter of the character disclosed, the combination of a cathode follower having a low impedance output and a high impedance input for receiving a transient voltage to be measured, a condenser and a diode rectifier connected in series circuit across said output for charging the condenser to a voltage corresponding to the peak value of said transient voltage, said condenser having sufficiently low capacitance and said diode having low impedance whereby the charging circuit for the condenser including the low output impedance of the cathode follower provides an R. C. time constant corresponding approximately to the interval required for the transient voltage to rise to its peak value, and a high impedance vacuum tube voltmeter for measuring said voltage on the condenser thereby to provide a measure of the peak value of the transient voltage, said voltmeter comprising a cathode follower circuit having a cathode load resistor and a tube having a floating grid connected to the junction between said rectifier and condenser, said cathode load resistor being of such a value that the grid current therethrough develops a voltage sufficient to compensate for the deviation of the condenser voltage from the voltage which should appear thereon as a true measure of the peak value of the transient voltage.

5. In a transient peak voltmeter of the character disclosed, the combination of a triode having a high impedance input circuit for receiving a transient voltage to be measured, a cathode follower operating circuit for said triode including a cathode load impedance therefor, a condenser and a diode rectifier connected in series circuit across said cathode load impedance for charging the condenser to a voltage corresponding to the peak value of said transient voltage, said condenser having sufficiently low capacitance and said diode having low impedance whereby the charging circuit for the condenser including the low output impedance of said cathode follower circuit provides an R. C. time constant corresponding approximately to the interval required for the transient voltage to rise to its peak value, a second triode having a floating grid connected to the junction between said condenser and said diode at the cathode thereof, a cathode follower operating circuit for said second triode including a cathode load impedance connected between the cathode thereof and the other side of the condenser, a voltage divider circuit connected between the plate of said second triode and said other side of the condenser and including a potentiometer, and an indicating meter connected between said potentiometer and the cathode of the second triode for providing an indication corresponding to the voltage on the condenser and indicative of the peak value of the transient voltage, said diode having a heater element and a separate insulated power source for supplying the heater thereby to avoid leakage of current from the condenser by way of the cathode of the diode, and said load impedance for the second triode having a value effective to cause grid current therein sufficient to compensate for the leakage current of the condenser whereby the grid current supplies the condenser energy losses due to said leakage current.

CLIFFORD M. RYERSON.
MILTON H. ARONSON.
LOUIS W. ERATH.

REFERENCES CITED

The following references are of record in the file of this patent:

UNITED STATES PATENTS

| Number | Name | Date |
| --- | --- | --- |
| 1,611,716 | Brown | Dec. 21, 1926 |
| 2,139,474 | Shepard | Dec. 6, 1938 |
| 2,143,219 | Wenger | Jan. 10, 1939 |
| 2,323,762 | George | July 6, 1943 |
| 2,350,545 | Bradford | June 6, 1944 |
| 2,389,991 | Mayle | Nov. 27, 1945 |